(12) United States Patent
Usgaonkar et al.

(10) Patent No.: US 10,244,050 B2
(45) Date of Patent: Mar. 26, 2019

(54) NETWORK-BASED ELASTIC STORAGE

(71) Applicant: NetApp, Inc., Sunnyvale, CA (US)

(72) Inventors: Ameya Prakash Usgaonkar, Old Goa (IN); Ramana Reddy, Srikakulam (IN); Bhaskar Singhal, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 649 days.

(21) Appl. No.: 14/805,147

(22) Filed: Jul. 21, 2015

(65) Prior Publication Data

US 2017/0026469 A1  Jan. 26, 2017

(51) Int. Cl.
*G06F 15/167* (2006.01)
*H04L 29/08* (2006.01)
*G06F 9/455* (2018.01)

(52) U.S. Cl.
CPC ...... *H04L 67/1097* (2013.01); *G06F 9/45558* (2013.01); *G06F 2009/45595* (2013.01)

(58) Field of Classification Search
CPC .......................... H04L 67/1097; G06F 9/45558
See application file for complete search history.

(56) References Cited

U.S. PATENT DOCUMENTS

| | | | |
|---|---|---|---|
| 9,128,626 B2* | 9/2015 | Chacko | G06F 3/0604 |
| 9,229,749 B2* | 1/2016 | Chandrasekaran | G06F 9/455 |
| 9,424,059 B1* | 8/2016 | Sivaprakasam | H04L 65/80 |
| 2004/0250021 A1* | 12/2004 | Honda | G06F 3/0605 711/114 |
| 2011/0093679 A1* | 4/2011 | Cyr | G06F 3/0607 711/170 |
| 2014/0372721 A1* | 12/2014 | Nakajima | G06F 3/0607 711/165 |
| 2017/0060458 A1* | 3/2017 | Kottomtharayil | G06F 3/0605 |

\* cited by examiner

*Primary Examiner* — Frantz B Jean
(74) *Attorney, Agent, or Firm* — Cesari and McKenna, LLP

(57) ABSTRACT

A request to change one or more storage characteristics associated with a virtual storage device is received. Communications identifying the virtual storage device are routed, via a network, to a first storage endpoint. One or more operations are performed in accordance with the request. A configuration of the network is updated to route communications identifying the virtual storage device to a second storage endpoint.

20 Claims, 8 Drawing Sheets

NETWORK-BASED ELASTIC STORAGE

BACKGROUND

The disclosure generally relates to the field of storage systems, and more particularly to storage systems in virtual computing environments.

Virtual computing environments provide virtual computing functionality through the use of virtual machines. A virtual machine emulates a computing system using software executing on a physical server. The virtual machine is managed by a hypervisor and multiple virtual machines can run on the same physical server.

Virtual machines operate like a physical computing system, and thus read and write data to storage. However, the actual storage devices that make up the storage are coupled with the physical server on which the virtual machine is executing. To allow applications executing within the virtual machine to access the storage, the hypervisor is configured to access the storage device(s). The hypervisor provides the storage device(s) to an operating system executing within the virtual machine, which makes the storage device(s) available for use by applications executing within the virtual machine.

Virtual computing environments can include virtual storage devices. A virtual storage device is a logical storage construct that appears, to a hypervisor and other components, to be a physical storage device. However, input/output commands sent to the virtual storage device are routed to a particular storage endpoint associated with the virtual storage device.

BRIEF DESCRIPTION OF THE DRAWINGS

Aspects of the disclosure may be better understood by referencing the accompanying drawings.

DESCRIPTION

Figure 1:
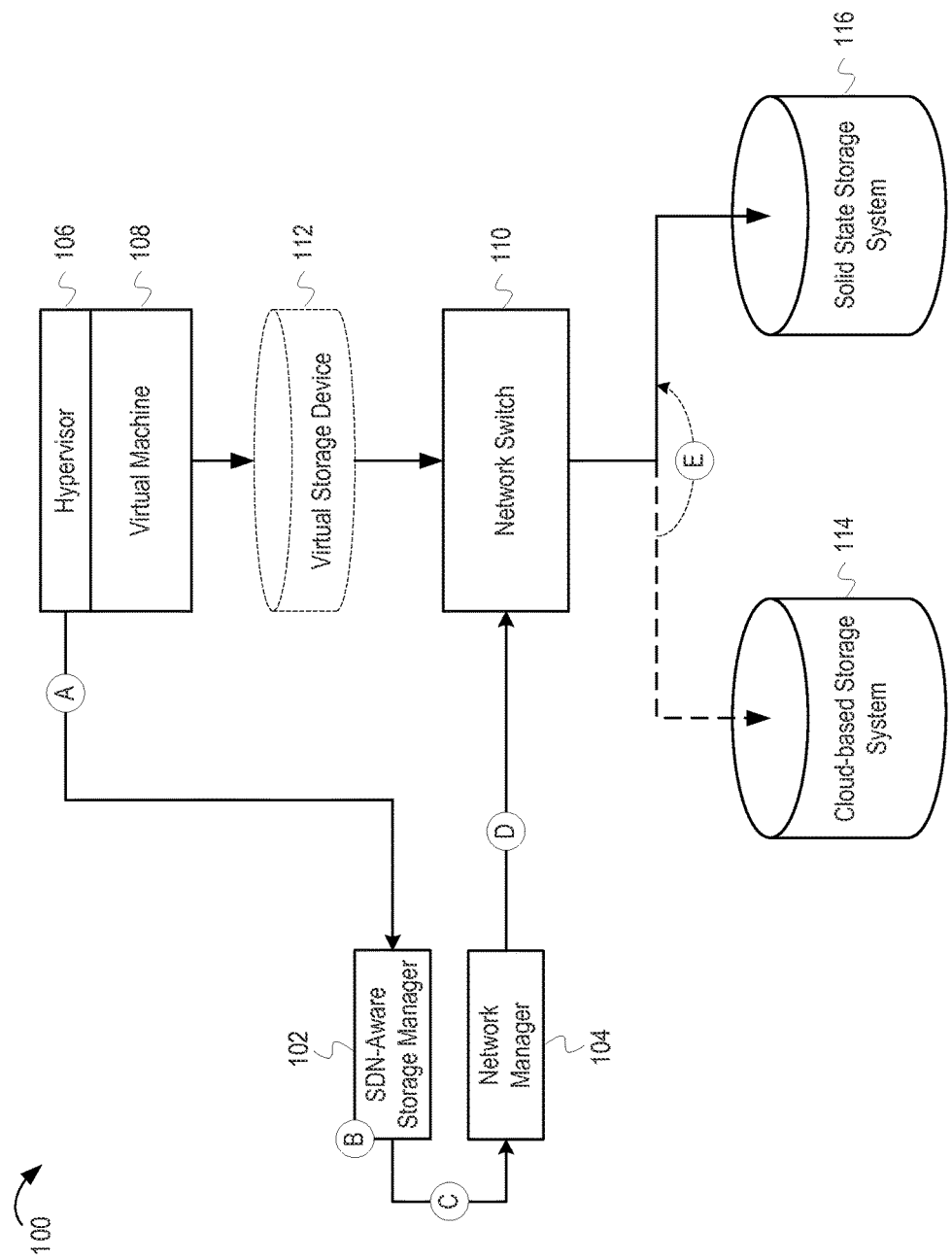
FIG. 1 depicts an example virtual computing environment with an SDN-aware storage manager.

The description that follows includes example systems, methods, techniques, and program flows that embody aspects of the disclosure. However, it is understood that this disclosure may be practiced without these specific details. For instance, this disclosure refers to solid state storage, cloud-based storage, etc. in illustrative examples. But aspects of this disclosure can be applied to other types of storage. In other instances, well-known instruction instances, protocols, structures and techniques have not been shown in detail in order not to obfuscate the description.

In a virtual computing environment, virtual machines have access to one or more virtual storage devices. Virtual storage devices are logical storage constructs created on top of physical storage systems or other logical storage constructs. When input/output (I/O) commands are "sent" to a virtual storage device by a virtual machine, the I/O commands are actually being sent to one or more storage endpoints, which can be a storage device or collection of storage devices (e.g., a storage system). The particular type of storage that makes up a storage endpoint underlying a virtual storage device can vary. For example, the storage endpoint might include hard drives, solid state drives, cloud-based storage, or a combination thereof.

Different types of storage have different characteristics. For example, accessing data stored on solid state drives is generally fast, while accessing data stored in cloud-based storage is generally slow (relative to other types of storage). Available space on a solid state drive is limited, and to add space additional solid state drives are added to the storage system. Available space in cloud-based storage, however, can be virtually unlimited and can be added programmatically. Thus, different types of storage may be used depending on the characteristics of the stored data and the applications that use the data. However, the manner in which a program uses data can change over time. For example, large amounts of data may be analyzed overnight to reduce the impact of users during normal business hours. Thus, during the day the data might not be accessed frequently, but during the night the data might be accessed in bulk.

To optimize storage based on changing conditions, like data access patterns, an application executing on a virtual machine generally provisions a new virtual storage device with the appropriate characteristics and copies the relevant data to the new virtual storage device. This presumes that the application has access to functionality (via the virtual machine or an associated hypervisor) that allows the application to provision a new virtual storage device with particular characteristics, which might not always be the case. Further, the provisioning of an additional virtual storage device is disruptive to the operation of the application. For example, provisioning a new virtual storage device is functionally similar to expanding storage by adding a new hard drive: applications typically do not seamlessly switch to using the new virtual storage device. Instead, the hypervisor is configured to provide a virtual machine running the application access to the virtual storage device. In turn, the virtual machine presents the virtual storage device to an operating system as a new device and the application is configured to use the new virtual storage device. However, software-defined networking can be leveraged to transparently change the characteristics of the storage underlying a virtual storage device.

To transparently change the storage characteristics of a virtual storage device, a storage manager determines that the storage characteristics should be changed. For example, an application accessing the virtual storage device might request a different type of storage or the storage manager might determine that the current storage endpoint cannot support a particular service level objective (SLO). The storage manager provisions a new storage endpoint that matches the storage characteristics and redirects I/O commands to the new storage endpoint by modifying a network configuration of a network that includes a user of the virtual storage device and the new storage endpoint.

FIG. 1 depicts an example virtual computing environment with an SDN-aware storage manager. FIG. 1 depicts a virtual computing environment 100, including an SDN-aware storage manager (hereinafter "storage manager") 102, a network manager 104, a hypervisor 106, and a network switch 110 (hereinafter "switch 110"). The hypervisor 106 manages a virtual machine 108. The virtual computing environment 100 also includes a virtual storage device 112, a cloud-based storage system 114, and a solid state storage system 116. The cloud-based storage system 114 and the solid state storage system 116 are examples of storage endpoints.

In this example, it is assumed that the components of the virtual computing environment 100 are communicatively coupled via a network (not depicted). Thus, the virtual machine 108, the virtual storage device 112, the cloud-based storage system 114, and the solid state storage 116 are each identified by a unique network identifier (such as an Internet Protocol (IP) address or World Wide Name). Similarly, the storage manager 102, the network manager 104, and the switch 110 are also each identified by a unique network identifier. The storage manager 102, the network manager 104, and the switch 110 communicate via one or more Application Program Interfaces (APIs). In this example, the storage manager 102 implements a storage-specific API, the network manager 104 implements a networking-specific API, and the switch 110 implements a network switch-specific API.

Because the virtual storage device 112 is a logical construct, it cannot actually send and receive communications, such as I/O commands. However, from the perspective of the virtual machine 108, communications are sent to, and received from the virtual storage device 112. In reality, the communications are sent to and received from the underlying storage. However, to simplify the descriptions herein, communications will be described as being sent to and received from the virtual storage device 112 as appropriate.

The virtual machine 108 communicates with the virtual storage device 112 by sending I/O commands over the network. Each I/O command includes a destination field or other mechanism that identifies the destination of the respective I/O command (e.g., a network identifier, a stream identifier, etc.). The switch 110 receives the I/O commands and determines that the I/O commands identify the virtual storage device 112 as being the destination. The switch 110 then routes the I/O commands based on a routing table. The I/O commands can be encapsulated in messages associated with different protocols. For example, an I/O command might be spread across multiple network packets when being transmitted across the network. The switch 110 may thus "route" the I/O commands by routing the associated network packets, which specify the destination of the I/O command.

Virtual Computing Environment Initial Configuration

In this example, the cloud-based storage system 114 initially serves as the storage underlying the virtual storage device 112. Thus, the switch 110 maintains a routing table similar to the one depicted in Table 1. When the switch 110 receives an I/O command from the virtual machine 108, the switch 110 looks up an entry in the routing table that includes the virtual machine network identifier in the "SOURCE" column and the virtual storage device network identifier in the "DESTINATION" column. If found, the switch 110 routes the I/O command to the component identified in the "ROUTE TO" column (in this case, the cloud-based storage system 114). The routing table also includes an entry for routing network traffic from the underlying storage back to the originating component. Typically, the routing table will include an entry corresponding to network traffic sent from the underlying storage to the originating component (e.g., I/O command responses sent from the cloud-based storage system 114 to the virtual machine 108). Thus, Table 1 includes an entry specifying that traffic received from the cloud-based storage system 114 that identifies the virtual machine 108 as the destination is routed to the virtual machine 108.

TABLE 1

| SOURCE | DESTINATION | ROUTE TO |
| --- | --- | --- |
| Virtual Machine Network Identifier | Virtual Storage Device Network Identifier | Cloud-based Storage System Network Identifier |
| Cloud-based Storage System Network Identifier | Virtual Machine Network Identifier | Virtual Machine Network Identifier |

Example Operations

Stages A through E depict example operations performed by the components of the virtual computing environment 100 to transparently change the storage underlying the virtual storage device 112.

At stage A, the hypervisor 106 requests that the storage manager 102 change one or more storage characteristics. The request conforms to the storage-specific API implemented by the storage manager 102. Storage characteristics can include available storage space, maximum throughput, storage type, etc. For example, the hypervisor 106 might indicate that read performance should be increased or that the underlying storage should be solid state-based (e.g., flash memory based). In this example, the request identifies the virtual machine 108 and the virtual storage device 112 and indicates that the read performance of the underlying storage should be increased.

At stage B, the storage manager 102 determines one or more modifications to be made to the underlying storage in accordance with the request received from the hypervisor 106 at stage A. The particular technique used to determine the modifications can vary. For example, if the request specifies that the underlying storage should be solid state-based, the storage manager 102 might identify one or more solid state drives. If the request specifies that the read performance of the underlying storage should be increased, the storage manager 102 might identify one or more storage systems that have better read performance than the cloud-based storage system 114. For example, the storage manager 102 might access a database or other data source that includes information about storage systems available to the storage manager 102. In this example, the storage manager 102 determines that modifying the underlying storage to use the solid state storage system 116 will increase the read performance sufficiently to satisfy the request from the hypervisor 106.

At stage C, the storage manager 102 requests that the network manager 104 update the network configuration such that network traffic from the virtual machine 108 to the virtual storage device 112 is routed to the solid state storage system 116 ("first storage manager request"). Additionally, the storage manager 102 requests that the network manager 104 update the network configuration such that network traffic from the solid state storage system 116 to the virtual machine 108 is routed to the virtual machine 108 ("second storage manager request"). The requests can be sent individually or together as an aggregate request. The requests conform to the network-specific API implemented by the network manager 104. In this example, the first storage manager request identifies the virtual machine 108, the virtual storage device 112, and the solid state storage system 116 as the "source", "destination", and "route to" components, respectively (corresponding to the columns of the routing table). The second storage manager request identifies the solid state storage system 116 as the "source" component and the virtual machine 108 as the "destination" and "route to" component.

At stage D, the network manager 104 requests that the switch 110 route network traffic to the solid state storage system 116 if the network traffic is received from the virtual machine 108 and identifies the virtual storage device 112 as the destination ("first network manager request"). Additionally, the network manager 104 requests that the switch 110 route network traffic to the virtual machine 108 if the network traffic is received from the solid state storage system 116 and identifies the virtual machine 108 as the destination ("second network manager request"). The requests conform to the network switch-specific API implemented by the switch 110. Prior to sending the requests to the switch 110, the network manager 104 may perform additional operations. For example, the requests received from the storage manager 102 might identify the virtual machine 108, virtual storage device 112, and solid state storage system 116 by component identifiers instead of network identifiers. The use of component identifiers instead of network identifiers allows the component's network identifiers to change (e.g., if the network configuration changes) without impacting the ability of the hypervisor 106 and storage manager 102 to identify the components. Thus, the network manager 104 might identify the network identifier associated with each of the virtual machine 108, virtual storage device 112, and solid state storage system 116 based on the component identifier. Additionally, the network manager 104 may perform operations to identify the switch 110 as being the network switch that communicatively couples the virtual machine 108 with the cloud-based storage system 114 and the solid state storage system 116.

At stage E, the switch 110 updates the routing table in accordance with the requests from the network manager 104. In particular, the switch 110 updates the routing table so that network traffic is routed to the solid state storage system 116 if the network traffic is received from the virtual machine 108 and identifies the virtual storage device 112, as depicted in Table 2. The switch 110 further updates the routing table so that network traffic is routed to the virtual machine 108 if the network traffic is received from the solid state storage system 116 and identifies the virtual machine 108.

TABLE 2

| SOURCE | DESTINATION | ROUTE TO |
|---|---|---|
| Virtual Machine Network Identifier | Virtual Storage Device Network Identifier | Solid State Storage System Network Identifier |
| Solid State Storage System Network Identifier | Virtual Machine Network Identifier | Virtual Machine Network Identifier |

After the switch 110 updates the routing table, I/O commands sent to the virtual storage device 112 by the virtual machine 108 will be routed to the solid state storage system 116 instead of the cloud-based storage system 114.

Because the virtual storage device network identifier does not change, the virtual machine 108 can continue to send I/O commands that identify the virtual storage device 112 as the destination, even after the routing table is updated. Thus, the switch to the solid state storage system 116 is mostly transparent to the virtual machine 108. In some instances, there may be some side effects noticeable to the virtual machine 108. For example, some I/O commands may be held, dropped, or rejected, causing some delays. However, these side effects can occur under normal operating conditions, and are thus not unique to the processes described herein.

The storage manager 102 can be implemented to interface with multiple, heterogeneous storage systems. Thus, by routing I/O commands via the switch 110, instead of using an element of a particular storage system (e.g., a storage controller) to route I/O commands, the storage manager 102 allows the virtual storage device 112 to use heterogeneous storage systems as storage endpoints.

While embodiments that include the aspects described above can vary, some specific, non-exclusive variations are described below.

Variations—Stage A

The example above depicts the request to change one or more storage characteristics as originating at the hypervisor 106. However, the request to change storage characteristics can originate from any component, including the storage manager 102. For example, the solid state storage system 116 might monitor various aspects of its operation, such as the amount of available storage, the processing load, etc. If the solid state storage system 116 determines that an action should be taken, the solid state storage system 116 might request the change to the storage characteristics. For example, if the solid state storage system 116 determines that the amount of available storage has fallen below a particular threshold, the solid state storage system 116 might request that the storage manager 102 provision additional storage.

As another example, the storage manager 102 can monitor various SLOs related to the storage performance of the virtual computing environment 100. For example, the storage manager 102 might monitor the average throughput of storage operations. If the storage manager 102 determines that the average throughput of the storage operations falls below a particular threshold, the storage manager 102 might determine that the storage characteristics should be changed.

Similarly, SLOs associated with the virtual computing environment 100 can change. The storage manager 102 may receive a notification or otherwise determine that an SLO has changed. The storage manager 102 can determine that storage characteristics should be changed in order to satisfy the new SLO.

The storage characteristics can vary based on the implementation of the storage manager 102, capabilities of associated storage systems, etc. Consider, for example, the size of the storage underlying the virtual storage device 112. Some storage systems can be dynamically resized. Thus, resizing such storage systems might not result in updates to the routing table. Other storage systems, however, might not be capable of being dynamically resized. Thus, to effectively resize the storage system, a new storage system is provisioned and the routing table is updated to route I/O commands to the newly provisioned storage system. When the underlying storage system can be dynamically resized, a request to resize the underlying storage might not be a storage characteristic that results in the provisioning of a new storage system. When the underlying storage system can be dynamically resized, however, a request to resize the underlying storage system might not result in the provisioning of a new storage system.

Variations—Stage B

The particular operations performed by the storage manager 102 at stage B can vary based on the storage characteristics indicated in the request received at stage A, the capabilities of the underlying storage, where the request originated, etc. For example, for storage characteristics that define the type of underlying storage to be used (e.g., solid state-based, hard drive-based, etc.) the storage manager 102 may be able to identify compatible storage from already existing storage. In some instances, however, the storage manager 102 may perform additional analysis. For example, the request may specify a particular SLO. The storage manager 102 might access information associated with the SLO, identify the storage available to the storage manager 102, and compare statistics associated with the available storage to the SLO. The storage manager 102 can determine the capabilities of storage systems available to the storage manager and, in some instances, the storage manager 102 may perform operations to configure a storage system for use.

Although the storage manager 102 is depicted as sending both the first storage manager request and the second storage manager request at stage B, the requests can be sent at different times. For example, the storage manager 102 might delay the second storage manager request until the storage manager 102 confirms that all I/O commands sent to the cloud-based storage system 114 have been completed (and responded to, if appropriate). Additionally, the storage manager 102 may perform two requests in place of the second storage manager request. In particular, the storage manager 102 can send a first request to add an entry that allows network traffic from the solid state storage system 116 to flow to the virtual machine 108. Subsequently, the storage manager 102 can send a second request to remove the entry that allows network traffic from the cloud-based storage system 114 to flow to the virtual machine 108. In other words, instead of modifying an existing entry in the routing table, a new entry is added and an existing entry is removed. Thus, there may be some time in which network traffic from both storage systems is routed to the virtual machine 108, allowing for all in-flight I/O commands sent to the cloud-based storage system 114 to be completed. The second request can be sent after a certain length of time or after the storage manager 202 determines that all in-flight I/O commands sent to the cloud-based storage system 114 have been completed.

Variations—Stage D

In an actual virtual computing environment, the network that communicatively couples the components is typically more complex than that depicted in FIG. 1. For example, the virtual machine 108 may be communicatively coupled with the cloud-based storage system 114 via the switch 110, while the virtual machine 108 is communicatively coupled with the solid state storage system 116 via a different network switch. Thus, the operations performed by the network manager 104 at stage D can vary. Consider the previous example in which the cloud-based storage system 114 and the solid state storage system 116 are communicatively coupled with the virtual machine 108 via different network switches and assume that the virtual machine 108 sends all network traffic to the switch 110. The network manager 104 would update the routing table on the switch 110 such that network traffic from the virtual machine 108 to the virtual storage device 112 would be routed to the other network switch. The routing table on the other network switch would be updated such that network traffic originating from the virtual machine 108 to the virtual storage device would be routed to the solid state storage system 116.

The requests sent from the network manager 104 to the switch 110 can vary similarly to the requests sent from the storage manager 102 to the network manager 104, as described above. For example, the second network manager request might be split into two requests corresponding to the two requests used instead of the second storage manager request.

Variations—Generally

The switch 110 can be a physical network switch or a virtual network switch implemented as a virtual machine or using similar techniques. The switch 110, as described above, implements an API to facilitate programmatic communications with other components. Thus, the switch 110 can be an SDN-enabled network switch.

The virtual machine 108 is described above as sending I/O commands to the virtual storage device 112. In an actual implementation, the I/O commands can originate from one or more applications executing on the virtual machine 108. Additionally, the I/O commands might pass through the hypervisor 106 before being sent to the virtual storage device 112. When multiple applications are present on the virtual machine 108, I/O commands originating from different applications may be routed to different storage systems. The operations described above can be adapted accordingly. For example, each application may be assigned a particular network identifier or component identifier, or may send I/O commands to a particular port number. The routing table maintained by the switch 110 can thus match entries based on criteria other than or in addition to a network identifier.

The routing of the I/O commands is accomplished in this example by routing all network traffic from the virtual machine 108 that identifies the virtual storage device 112 as the destination. In some instances, the storage manager 102 can specify that only a subset of the network traffic be routed. For example, the request sent from the storage manager 102 to the network manager 104 at stage C might indicate that network packets with a particular flag set should be routed to the solid state storage system 116. The routing table maintained by the switch 110 can include one or more columns corresponding to criteria used to identify packets to route, as depicted in Table 3.

TABLE 3

| SOURCE | DESTINATION | CRITERIA | ROUTE TO |
| --- | --- | --- | --- |
| Virtual Machine Network Identifier | Virtual Storage Device Network Identifier | flag1 = 0x1A | Cloud-based Storage System Network Identifier |

Although not described above, responses to I/O commands are routed by the switch 110 to the appropriate destination. Thus, a response received by the switch 110 from the solid state storage system 116 after stage E would be routed to the virtual machine 108 in accordance with the routing table.

The cloud-based storage system 114 and the solid state storage system 116 are examples of many possible storage systems. For example, a storage system can be hard drive-based or can combine any of the available storage technologies into a hybrid storage system. A storage system can include a single storage device or an array of storage devices. Similarly, a storage system can be a collection of other storage systems. For example, a storage system can comprise multiple, redundant clustered storage systems.

Additionally, a particular storage system may be a logical construct. For example, while a particular storage system might present itself as a single storage device, the storage system might actually include physical storage spread across multiple storage devices. The physical storage might be shared with other storage systems.

The operations described above are not limited to virtual computing environments with a single virtual machine. When multiple virtual machines are present, the virtual machines can use the same virtual storage device while the storage manager provides each virtual machine with unique storage characteristics. In other words, each virtual machine can send I/O commands to the same virtual storage device, but the I/O commands for one virtual machine can be routed differently to different underlying storage than the I/O commands for the other virtual machine.

Figure 2:
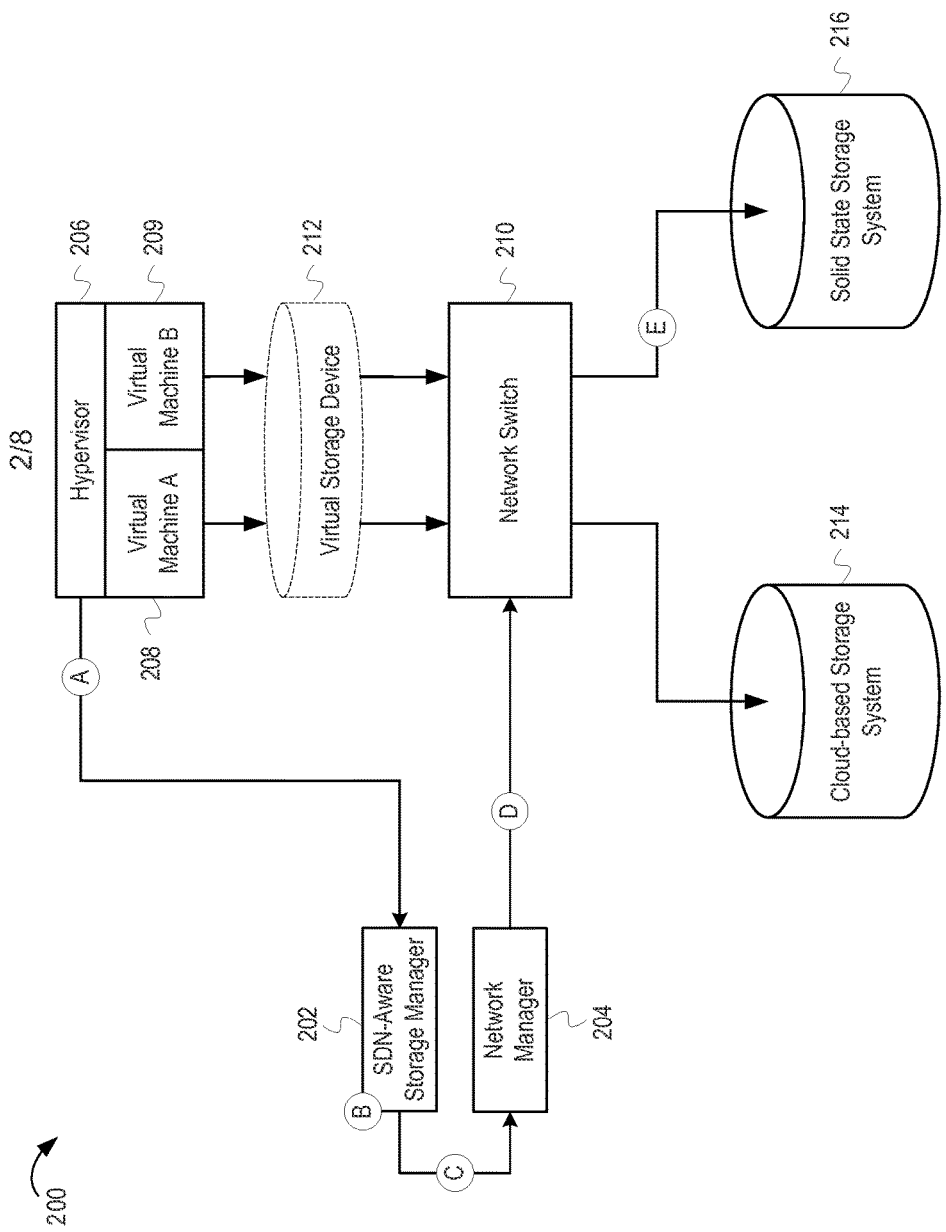
FIG. 2 depicts an example virtual computing environment with an SDN-aware storage manager and multiple virtual machines.

FIG. 2 depicts an example virtual computing environment with a storage manager and multiple virtual machines. FIG. 2 depicts a virtual computing environment 200, including a storage manager 202, a network manager 204, a hypervisor 206, and a network switch 210 (hereinafter "switch 210"). The hypervisor 206 manages two virtual machines, virtual machine A 208 and virtual machine B 209. The virtual computing environment 200 also includes a virtual storage device 212, a cloud-based storage system 214, and a solid state storage system 216.

The virtual computing environment 200 can be configured substantially similar to the virtual computing environment 100 depicted in FIG. 1. Each of the components of the virtual computing environment 200 is identified by a network identifier and may also be identified by a component identifier. The switch 210 maintains a routing table similar to the routing table maintained by the switch 110 depicted in FIG. 1. The initial routing table maintained by the switch 210 is depicted below in Table 4.

TABLE 4

| SOURCE | DESTINATION | ROUTE TO |
| --- | --- | --- |
| Virtual Machine A Network Identifier | Virtual Storage Device Network Identifier | Cloud-based Storage System Network Identifier |
| Cloud-based Storage System Network Identifier | Virtual Machine A Network Identifier | Virtual Machine A Network Identifier |

Based on the initial routing table, the switch 210 routes network traffic to the cloud-based storage system 214 if the network traffic is received from virtual machine A 208 and identifies the virtual storage device 212 as the destination. Initially, no storage is provisioned for virtual machine B 209, so the initial routing table does not have an entry for virtual machine B 209.

Example Operations

At stage A, the hypervisor 206 requests that the storage manager 202 provision solid state-based storage for virtual machine B 209. The request conforms to the storage-specific API implemented by the storage manager 202. Provisioning a particular type of storage is an example of a request to change one or more storage characteristics. The request identifies virtual machine B 209 and the virtual storage device 212.

At stage B, the storage manager 202 identifies the solid state storage system 216 as conforming to the request received at stage A. After the storage manager 202 receives the request, the storage manager 202 analyzes available storage systems to determine which of the storage systems meet the criteria specified in the request. In this example, the request specifies that the storage be solid state-based, although various other criteria can be specified. For example, the request can identify specific storage characteristics, identify an SLO, etc. If the storage manager 202 identifies multiple candidate storage systems, the storage manager 202 might select one based on various factors, such as current load, geographic proximity to virtual machine B 209, etc.

At stage C, the storage manager 202 requests that the network manager 204 update the network configuration such that network traffic from virtual machine B 209 to the virtual storage device 212 is routed to the solid state storage system 216 ("first storage manager request"). Additionally, the storage manager 202 requests that the network manager 204 update the network configuration such that network traffic from the solid state storage system 216 to virtual machine B 209 is routed to virtual machine B 209 ("second storage manager request"). The requests conform to the network-specific API implemented by the network manager 204. In this example, the first storage manager request identifies virtual machine B 209, the virtual storage device 212, and the solid state storage system 216 as the "source", "destination", and "route to" components respectively. The second storage manager request identifies the solid state storage system 216 as the "source" component and the virtual machine B 209 as the "destination" and "route to" components.

At stage D, the network manager 204 requests that the switch 210 route network traffic to the solid state storage system 216 if the network traffic is received from virtual machine B 209 and identifies the virtual storage device 212 as the destination. Additionally, the network manager 204 requests that the switch 210 route network traffic to virtual machine B 209 if the network traffic is received from the solid state storage system 216. The requests conform to the network switch-specific API implemented by the switch 210. As described above at stage D of FIG. 1, the network manager 204 may perform additional operations prior to sending the requests to the switch 210.

At stage E, the switch 210 updates the routing table in accordance with the requests from the network manager 204. In particular, the switch 210 adds an entry to the routing table so that network traffic is routed to the solid state storage system 216 if the network traffic is received from virtual machine B 209 and identifies the virtual storage device 212, as depicted by the second entry in Table 5. The switch 210 further updates the routing table so that network traffic is routed to virtual machine B 209 if the network traffic received from the solid state storage system 216 and identifies virtual machine B 209.

TABLE 5

| SOURCE | DESTINATION | ROUTE TO |
| --- | --- | --- |
| Virtual Machine A Network Identifier | Virtual Storage Device Network Identifier | Cloud-based Storage System Network Identifier |
| Cloud-based Storage System Network Identifier | Virtual Machine A Network Identifier | Virtual Machine A Network Identifier |
| Virtual Machine B Network Identifier | Virtual Storage Device Network Identifier | Solid State Storage System Network Identifier |
| Solid State Storage | Virtual Machine B | Virtual Machine B |

TABLE 5-continued

| SOURCE | DESTINATION | ROUTE TO |
|---|---|---|
| System Network Identifier | Network Identifier | Network Identifier |

After the switch 210 updates the routing table, I/O commands sent to the virtual storage device 212 by virtual machine B 209 will be routed to the solid state storage system 216.

Because the virtual storage device 212 is used for both virtual machines, the operations performed by the hypervisor 206 are simplified. In particular, instead of provisioning storage for virtual machine B 209 and creating a new virtual storage device, the hypervisor 206 can use the existing virtual storage device 212. In environments with many potential virtual machines that can be provisioned and released dynamically, the number of virtual storage devices managed by the hypervisor 206 can be decreased significantly.

The examples depicted above in FIGS. 1 and 2 can be extended to virtual computing environments with any number of hypervisors, virtual machines, network components, and storage systems. Additionally, multiple storage managers and/or network managers can be coordinated to perform the operations. The variations described above in relation to FIG. 1 can apply to FIG. 2. Additionally, the examples of FIGS. 1 and 2 are presented separately to aid in understanding this disclosure. In an actual virtual computing environment, the operations depicted in FIGS. 1 and 2 can be performed together in addition along with other variations.

Figure 3:
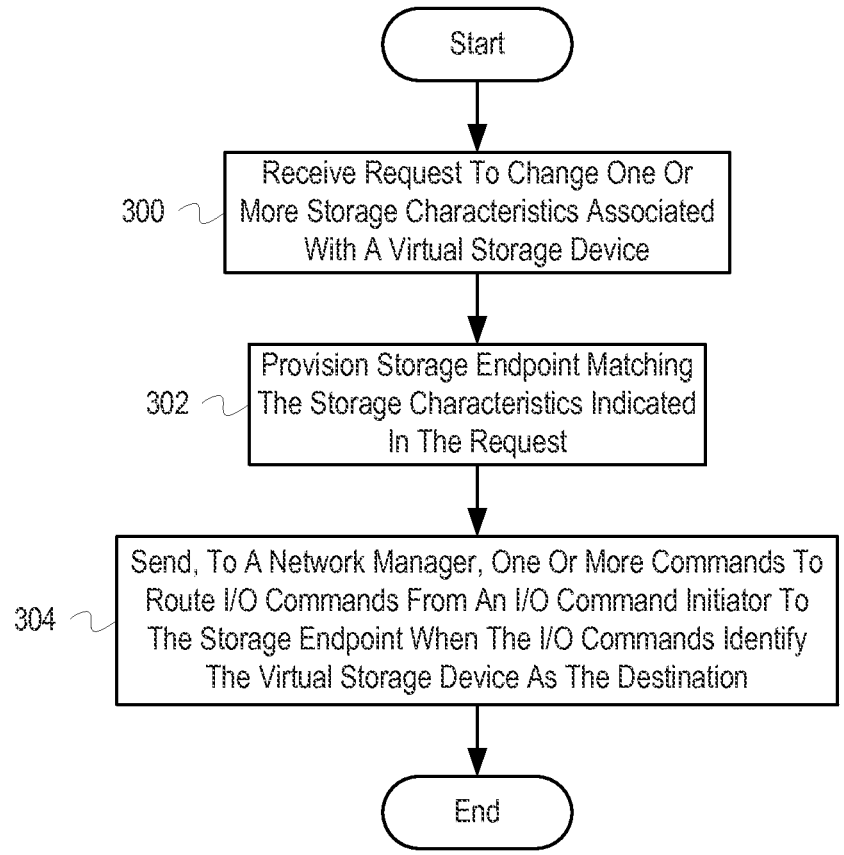
FIG. 3 depicts a flowchart of example operations for non-disruptively modifying the storage characteristics of a virtual storage device.

FIG. 3 depicts a flowchart of example operations for non-disruptively modifying the storage characteristics of a virtual storage device. The operations depicted in FIG. 3 can be performed by a storage manager, such as the storage manager 102 depicted in FIG. 1 or the storage manager 202 depicted in FIG. 2, or any suitable component.

At block 300, a storage manager receives a request to change one or more storage characteristics associated with a virtual storage device. The request can be received from another component communicatively coupled with the storage manager, such as a virtual machine, storage device, or network component. In some instances, the request can be generated by the storage manager itself. The one or more storage characteristics can vary depending on the requesting component, the capabilities of the underlying storage, the capabilities of related networking components, etc. For example, the storage characteristics can include the type of underlying storage, particular performance thresholds, SLOs, etc. The request can include data identifying the requesting component and the virtual storage device, such as component identifiers or network identifiers. After the storage manager receives the request to change the storage characteristics associated with the virtual storage device, control flows to block 302.

At block 302, the storage manager provisions a storage endpoint matching the storage characteristics indicated in the request. The storage manager can provision a storage endpoint by identifying one or more available storage devices and determining which of the available storage devices matches the storage characteristics or can be configured to match the storage characteristics. The storage manager may not provision the storage endpoint directly, but may request another storage manager provision the storage endpoint. For example, if the storage manager is communicatively coupled to a clustered storage system, the storage manager might send a request to provision the storage endpoint to a clustered storage system manager. The clustered storage system manager (or other storage manager) can then provision the storage endpoint for the storage manager and provide metadata identifying the provisioned storage endpoint to the storage manager. After the storage manager provisions the storage endpoint matching the storage characteristics indicated in the request, control flows to block 304.

At block 304, the storage manager sends, to a network manager, one or more commands to route I/O commands from an I/O command initiator to the storage endpoint when the I/O commands identify the virtual storage device as the destination. The I/O command initiator can be any component that sends I/O commands to a storage endpoint, such as an application running on a computing system or virtual machine, a virtual machine itself, a hypervisor, etc. The I/O command initiator can be specified by the request received at block 300 or determined based on other information. For example, the storage manager might determine the I/O command initiator by accessing metadata that identifies an I/O command initiator currently assigned a particular SLO or using the virtual storage device. The commands sent to the network manager identify the I/O command initiator, the storage endpoint, and the virtual storage device using component identifiers, network identifiers, or other kind of identifiers. The commands may not specifically request that I/O commands be routed accordingly, but instead request that all network traffic be routed accordingly. In some instances, however, the commands may include criteria that identify only I/O commands (such as an associated port number, application identifier, etc.). After the storage manager sends, to the network manager, the commands to route I/O commands from an I/O command initiator to the storage endpoint when the I/O commands identify the virtual storage device as the destination, the process ends.

Figure 4:
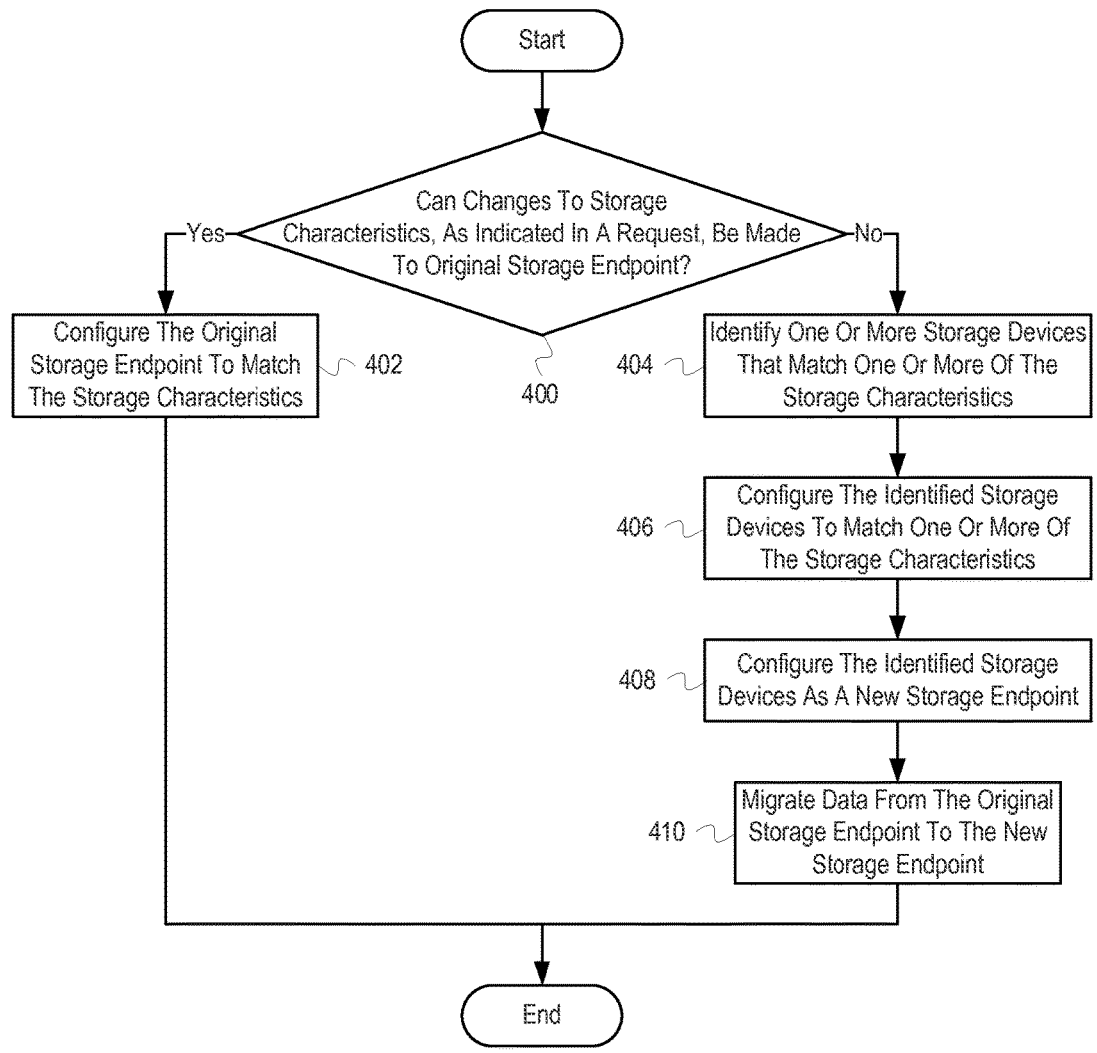
FIG. 4 depicts a flowchart of example operations for provisioning a storage endpoint that matches particular storage characteristics.

FIG. 4 depicts a flowchart of example operations for provisioning a storage endpoint that matches particular storage characteristics. The operations depicted in FIG. 4 can be performed by a storage manager, such as the storage manager 102 depicted in FIG. 1 or the storage manager 202 depicted in FIG. 2, or any suitable component. The operations depicted in FIG. 4 are examples of operations that can be performed at block 302 of FIG. 3.

At block 400, a storage manager determines whether changes to storage characteristics, as indicated in a request to change storage characteristics, can be made to an original storage endpoint. The request can be a request similar to that described at block 300 of FIG. 3. The original storage endpoint is a storage endpoint currently being used as the storage underlying a virtual storage device used in a virtual computing environment.

The specific operations performed by the storage manager to determine whether changes to the storage characteristics of the original storage endpoint can vary. For example, the storage manager might communicate with the original storage endpoint to determine whether the original storage endpoint supports the particular changes. The storage manager might access a data source that includes metadata identifying the capabilities of the original storage endpoint. In some instances, the storage manager might determine that the original storage endpoint matches the requested storage characteristics. For example, if an SLO has changed, the storage manager might determine that the original storage endpoint can support the SLO without any changes to the storage characteristics of the original storage endpoint. In some instances, the storage manager determines whether the changes to the storage characteristics can be made to the original storage endpoint by attempting to implement the changes and determining whether the attempt was successful. For example, the storage manager might send a request to the original storage endpoint to increase total storage capacity. If the request fails (e.g., if the storage manager receives an error or verifies that the total storage capacity of the original storage endpoint did not change), the storage manager determines that the changes to the storage characteristics cannot be made to the original storage endpoint. If the storage manager determines that changes to the storage characteristics can be made to the original storage endpoint, control flows to block 402. If the storage manager determines that changes to the storage characteristics cannot be made to the original storage endpoint, control flows to block 404.

At block 402, the storage manager configures the original storage endpoint to match the storage characteristics. For example, if the changed storage characteristics include a request for more available storage capacity, the storage manager might send a request to the original storage endpoint indicating the requested amount of available storage capacity. After the storage manager configures the original storage endpoint to match the storage characteristics, the process ends.

Control flowed to block 404 if, at block 400, the storage manager determined that changes to the storage characteristics cannot be made to the original storage endpoint. At block 404, the storage manager identifies one or more storage devices that match one or more of the storage characteristics. For example, the storage manager may maintain metadata identifying storage devices that have been registered with the storage manager as being available for use. The storage manager may access the metadata and/or communicate with the available storage devices to determine whether the available storage devices match one or more of the storage characteristics. The storage manager may use a subset of the storage characteristics indicated in the request to identify the storage devices. For example, some storage characteristics might be configurable while other storage characteristics might not be inherent traits of the storage devices. As a more particular example, the type of physical storage used by a storage device is an inherent trait of the storage device that might not be configurable. However, the block size used in I/O commands is a storage characteristic that might be configurable. Thus, the storage manager can exclude available storage devices based on some of the storage characteristics indicated in the request.

Further, the storage manager may iteratively exclude (or include) storage devices based on the storage characteristics indicated in the request. For example, if the storage characteristics include both a type of physical storage (e.g., solid state) and particular performance levels, the storage manager might first identify all storage devices that use the indicated type of physical storage. Once all storage devices that use the indicated type of physical storage are identified, the storage manager might determine which of the storage devices that use the indicated type of physical storage can meet the indicated performance levels. Such an iterative approach can allow the storage manager to reduce the number of candidate storage devices using more accessible information (such as metadata maintained by the storage manager itself) before using less accessible information (e.g., querying the storage devices themselves). After the storage manager identifies the storage devices that match one or more of the storage characteristics, control flows to block 406.

At block 406, the storage manager configures the identified storage devices to match one or more of the storage characteristics. The operations performed by the storage manager at block 406 can be substantially similar to those performed at block 402. For example, the storage manager might configure the block size, cache size, command queue depth, etc. of the identified storage devices. After the storage manager configures the identified storage devices to match one or more of the storage characteristics, control flows to block 408.

At block 408, the storage manager configures the identified storage devices as a new storage endpoint. For example, the storage manager might configure the identified storage devices into a clustered storage system by configuring one of the identified storage devices as a primary (or managing) node and identifying the other identified storage devices to the primary node as secondary nodes. The storage manager might request a network identifier for use by the new storage endpoint. In some instances, such as when a single storage device is used, the storage manager might use a network identifier previously assigned to the storage device (e.g., the storage manager may not perform additional operations to configure the storage device as the new storage endpoint). After the storage manager configures the identified storage devices as the new storage endpoint, control flows to block 410.

At block 410, the storage manager migrates data from the original storage endpoint to the new storage endpoint. The storage manager can perform the migration of the data itself or can delegate the migration of the data to another component. For example, the original storage endpoint and/or the new storage endpoint might implement functionality allowing for data to be migrated between the endpoints. Thus, for example, the storage manager might send a command to the original storage endpoint or the new storage endpoint identifying the other endpoint and the data to migrate, allowing the endpoints to handle the migration themselves. In some instances, one or both of the endpoints might not include functionality allowing for them to perform the data migration. Thus, the storage manager might itself perform the operations for migrating the data, such as reading the data from the original storage endpoint and writing it to the new storage endpoint. After the storage manager migrates the data from the original storage endpoint to the new storage endpoint, the process ends.

As mentioned above, the operations depicted in FIG. 4 are example operations and can vary. For example, in some instances, the one or more storage devices identified at block 404 might already be configured in a manner that is compatible with the one or more storage characteristics indicated in the request. As another example, there may be no data migration between the original storage endpoint and the new storage endpoint, as described at block 410. For example, the request might indicate that a cache should be used. Thus, the storage manager might provision a solid state-based storage device as a cache for the original storage endpoint, with the cache serving as the new storage endpoint. The storage manager can allow the new storage endpoint to naturally populate with data as it functions as a cache.

The particular operations performed to migrate data between storage systems, such as those described above at block 410, can vary. In particular, techniques used to migrate data can vary, and the associated operations can vary accordingly. For example, data stored on an original storage endpoint might be migrated by copying all of the data over to a new storage endpoint. As another example, data stored on an original storage endpoint can be migrated to a new storage endpoint incrementally. To migrate the data incrementally, metadata associated with the data, such as a file system layout, might be copied to the new storage endpoint. Once the metadata is copied to the new storage endpoint, a network switch can be configured to route all I/O commands to the new storage endpoint. As the new storage endpoint receives read commands for data that is on the original storage endpoint, the new storage endpoint can read the data from the original storage endpoint. The new storage endpoint then writes the data and sends the data to the I/O command initiator.

Figure 5:
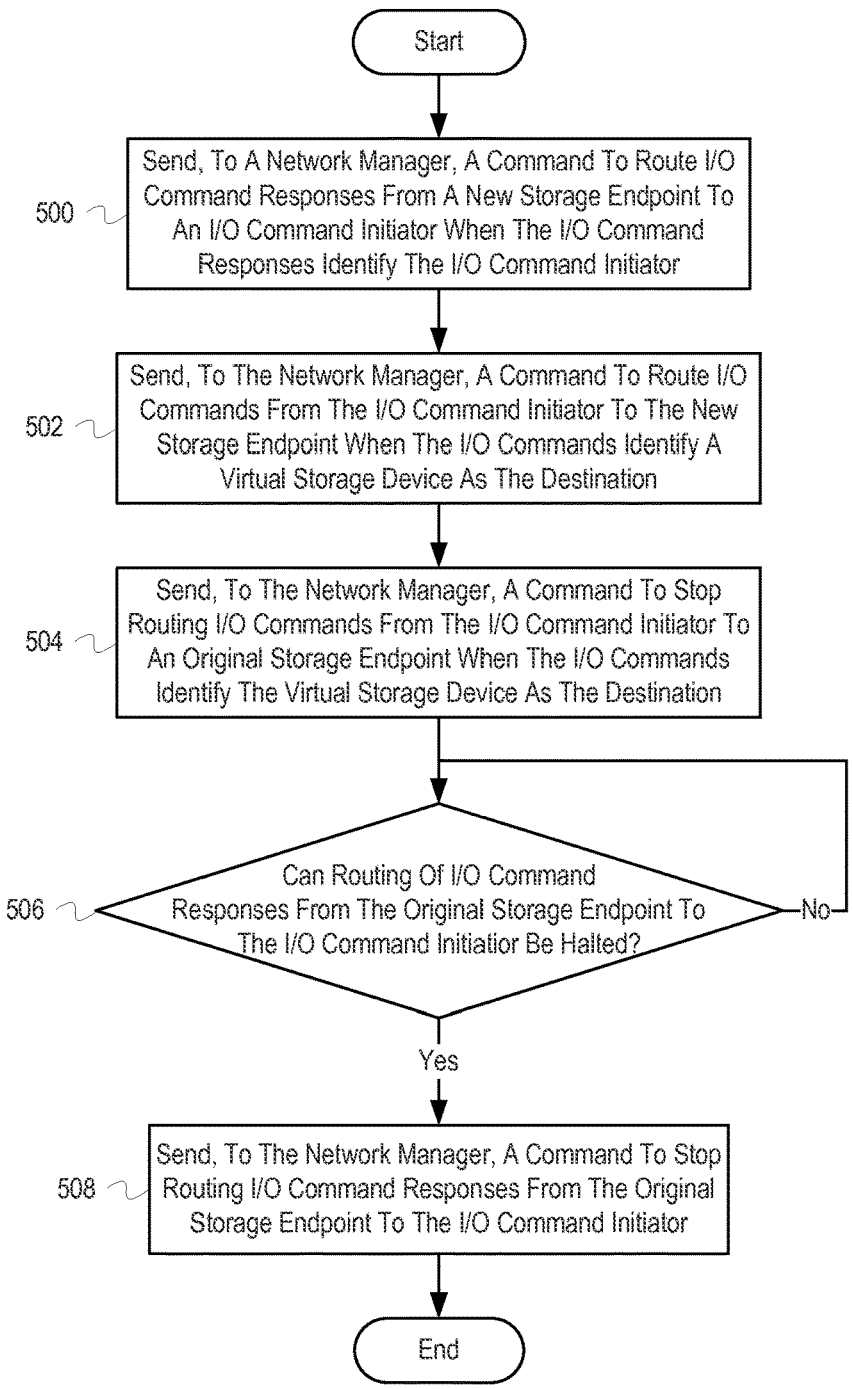
FIG. 5 depicts a flowchart of example operations for rerouting I/O commands from an original storage endpoint to a new storage endpoint.

FIG. 5 depicts a flowchart of example operations for rerouting I/O commands from an original storage endpoint to a new storage endpoint. The operations depicted in FIG. 5 can be performed by a storage manager, such as the storage manager 102 depicted in FIG. 1 or the storage manager 202 depicted in FIG. 2, or any suitable component.

The operations depicted in FIG. 5 are examples of operations that can be performed at block 304 of FIG. 3. The operations depicted in FIG. 5 assume that operations similar to those described above at FIG. 4 have been completed. In particular, the terms "original storage endpoint" and "new storage endpoint" refer to components similar to those identified by the same terms in FIG. 4. It is assumed that if an entry identifying a particular I/O command source (e.g., an I/O command initiator) or I/O command response source (e.g., a storage endpoint) does not exist, an I/O command from the I/O command/command response source is dropped. The operations in FIG. 5 are depicted in an order that may reduce the number dropped I/O commands and I/O command responses.

At block 500, a storage manager sends, to a network manager, a command to route I/O command responses from a new storage endpoint to an I/O command initiator when the I/O command responses identify the I/O command initiator the destination. The command can identify the new storage endpoint as the "source" of the I/O command responses and the I/O command initiator as the "destination" and the "route to" parameters. The new storage endpoint and the I/O command initiator can be identified by component identifiers, network identifiers, etc. After the storage manager sends the command to route I/O command responses from the new storage endpoint to the I/O command initiator with the I/O command responses identify the I/O command initiator, control flows to block 502.

At block 502, the storage manager sends, to the network manager, a command to route I/O commands from the I/O command initiator to the new storage endpoint when the I/O commands identify a virtual storage device as the destination. The command can identify the I/O command initiator, the virtual storage device, and the new storage endpoint as the "source", "destination", and "route to" parameters. The I/O command initiator, the virtual storage device, and the new storage endpoint can be identified by component identifiers, network identifiers, etc. After the storage manager sends the command to route I/O commands from the I/O command initiator to the new storage endpoint when the I/O commands identify a virtual storage device as the destination, control flows to block 504.

At block 504, the storage manager sends, to the network manager, a command to stop routing I/O commands from the I/O command initiator to an original storage endpoint when the I/O commands identify the virtual storage device as the destination. The command can identify the I/O command initiator, the virtual storage device, and the original storage endpoint as the "source", "destination", and "route to" parameters. The I/O command initiator, the virtual storage device, and the original storage endpoint can be identified by component identifiers, network identifiers, etc. After the storage manager sends the command to stop routing I/O commands from the I/O command initiator to the original storage endpoint when the I/O commands identify the virtual storage device as the destination, control flows to block 506.

At block 506, the storage manager determines whether routing of I/O command responses from the original storage endpoint to the I/O command initiator can be halted. For example, the storage manager may determine that there are no in-flight commands sent to the original storage endpoint (i.e., I/O command responses have been sent for all appropriate I/O commands sent to the original storage endpoint) or may determine that the I/O command initiator can take appropriate action if I/O command responses are not received (e.g., resending timed out in-flight commands). As another example, the storage manager might determine whether a predetermined amount of time has passed. If the storage manager determines that routing of I/O command responses from the original storage endpoint to the I/O command initiator can be halted, control flows back to block 506 (possibly after a wait period). If the storage manager determines that routing of I/O command responses from the original storage endpoint to the I/O command initiator can be halted, control flows to block 508.

At block 508, the storage manager sends, to the network manager, a command to stop routing I/O command responses from the original storage endpoint to the I/O command initiator. The command can identify the original storage endpoint as the "source" and the I/O command initiator as the "destination" and "route to" parameters. The original storage endpoint and the I/O command initiator can be identified by a component identifier, network identifier, or other identifier. After the storage manager sends the command to stop routing I/O command responses from the original storage endpoint to the I/O command initiator, the process ends.

After the storage manager performs the operations at block 500, I/O command responses sent from the new storage endpoint to the I/O command initiator are routed appropriately. If the operations depicted at block 502 were performed first, the I/O command initiator might send I/O commands to the new storage endpoint before the network was configured to route I/O command responses from the new storage endpoint to the I/O command initiator. If I/O command responses were sent by the new storage endpoint prior to the operations depicted at block 500 being performed, the I/O command responses might be dropped.

In some instances, the operations depicted in FIG. 5 can be performed in other orders. For example, the network manager might support transactions, allowing the storage manager to specify a set of operations that are performed atomically. Thus the network manager might temporarily halt routing of network traffic until updates to the network configuration are completed. Additionally, the I/O command initiator might be configured to handle dropped I/O commands and dropped I/O command responses such that the ordering of the operations does not matter. For example, the I/O command initiator might be implemented to resend I/O commands that have timed out.

Additionally, in some instances the operations depicted at block 506 may not be performed at all. Instead, the storage manager might direct a component to hold (e.g., queue) I/O commands while the network configuration is being updated. For example, the storage manager might send a request to a hypervisor to hold all I/O commands being sent to the virtual storage device. Once the network configuration updates have been completed, the storage manager can send another request to the hypervisor indicating that the I/O commands can continue being sent to the virtual storage device. The particular component that the storage manager directs to hold I/O commands can vary (e.g., the component can be a virtual machine, network switch, etc.).

Further, the operations depicted in FIG. 5 assume that all I/O commands from the I/O command initiator to the virtual storage device are routed similarly. However, in some instances, I/O commands may be routed differently based on various criteria. For example, I/O commands associated with a first application or storage protocol might be routed differently than I/O commands associated with a second application or storage protocol. The operations depicted in FIG. 5 can be adapted accordingly.

Relatedly, although FIG. 5 and the associated description refer to the routing of I/O commands, the network manager might not be implemented to specifically identify I/O commands. Instead, for example, the network manager may route network traffic without identifying and of the network traffic as actual I/O commands. Thus, from the perspective of the storage manager, the commands sent to the network manager may be to route I/O commands, while from the network manager's perspective the commands may be commands to route network traffic.

Figure 6:
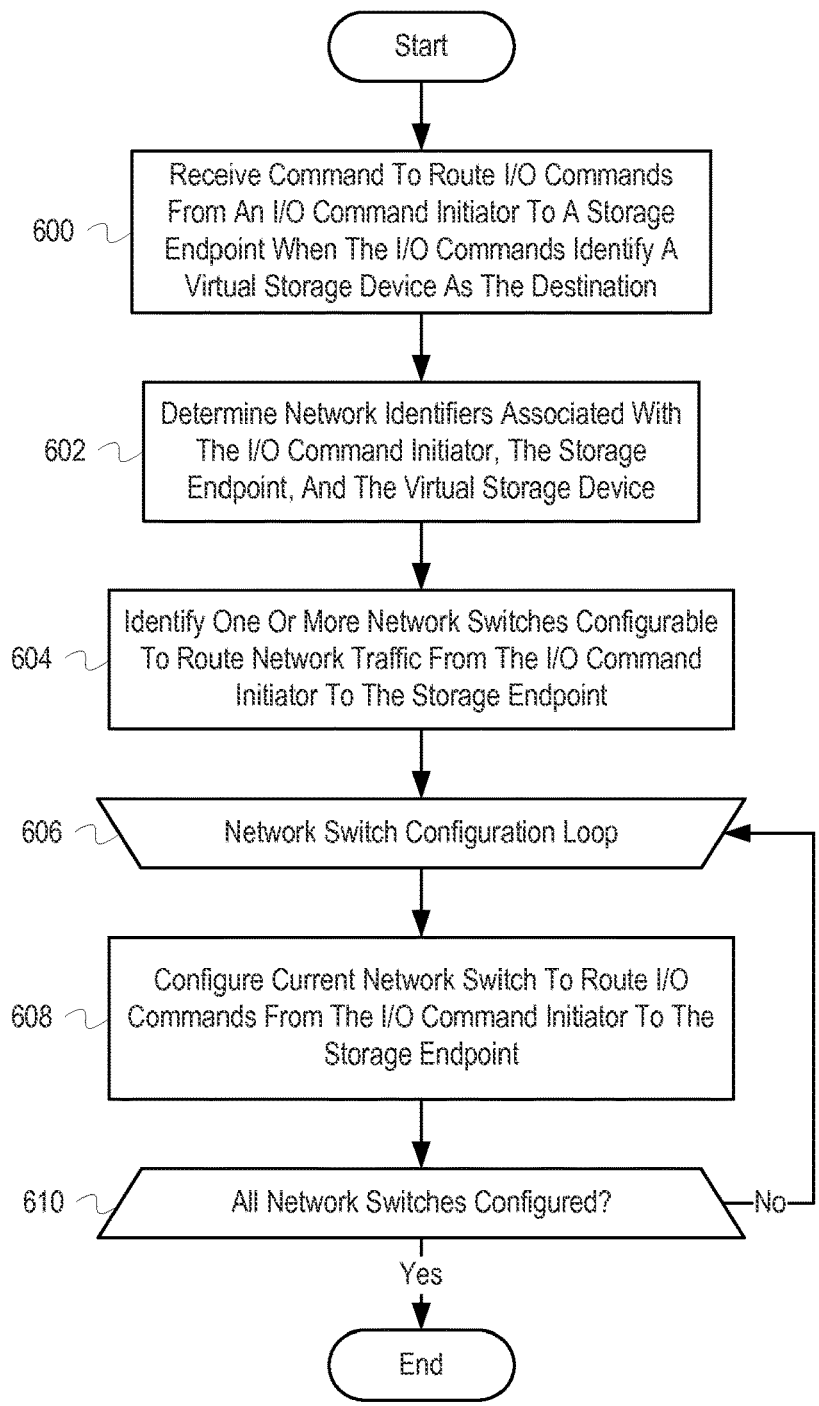
FIG. 6 depicts a flowchart of example operations for updating a network configuration to route I/O commands.

FIG. 6 depicts a flowchart of example operations for updating a network configuration to route I/O commands. The operations depicted in FIG. 6 can be performed by a network manager, such as the network manager 104 depicted in FIG. 1 or the network manager 204 depicted in FIG. 2, or any suitable component.

At block 600, a network manager receives a command to route I/O commands from an I/O command initiator to a storage endpoint when the I/O commands identify a virtual storage device as the destination. The request received by the network manager can be similar to the request sent by the storage manager at block 502 of FIG. 5. In particular, the command identifies the I/O command initiator, the virtual storage device, and the storage endpoint as "source", "destination", and "route to" parameters, respectively. The I/O command initiator, the virtual storage device, and the storage endpoint can be identified by a component identifier, network identifier, or other type of identifier. After the network manager receives the command to route I/O commands from the I/O command initiator to the storage endpoint when the I/O commands identify the virtual storage device as the destination, control flows to block 602.

At block 602, the network manager determines network identifiers associated with the I/O command initiator, the storage endpoint, and the virtual storage device. The particular operations performed by the network manager to determine the network identifiers can vary. For example, if the I/O command initiator, the storage endpoint, and the virtual storage device are identified in the request by network identifiers, the network manager can read the network identifiers from the request itself. If the I/O command initiator, the storage endpoint, and the virtual storage device are identified in the request by component identifiers or another type of identifier, the network manager may look up the network identifiers based on the component identifiers. For example, the network manager may search a mapping table or similar data structure for the component identifiers. After the network manager determines the network identifiers associated with the I/O command initiator, the storage endpoint, and the virtual storage device, control flows to block 604.

At block 604, the network manager identifies one or more network switches configurable to route network traffic from the I/O command initiator to the storage endpoint. In other words, the network manager identifies a set of network switches that form a path between the I/O command initiator and the storage endpoint. The network manager can analyze a network topography associated with a network that includes the I/O command initiator and the storage endpoint. Typically, the one or more network switches includes a network switch that is directly coupled with the I/O command initiator and a network switch that is directly coupled with the storage endpoint. The one or more network switches can include other network switches that comprise the network. After the network manager identifies the network switches that are configurable to route network traffic from the I/O command initiator to the storage endpoint, control flows to block 606.

At block 606, the network manager begins a network switch configuration loop. During the network switch configuration loop, the network manager iterates over the one or more network switches determined at block 604 and configures the network switch to route network traffic as appropriate. During the first pass through the network switch configuration loop, the network manager designates one of the one or more network switches to be a current network switch. During each subsequent pass through the network switch configuration loop, the network manager designates a different one of the one or more network switches (that has not previously been designated as the current network switch) to be the current network switch. After the network manager designates the current network switch, control flows to block 608.

At block 608, the network manager configures the current network switch to route I/O commands from the I/O command initiator to the storage endpoint. The particular operations performed by the network manager can vary based on the position of the current network switch in the path between the I/O command initiator and the storage endpoint. For example, if the current network switch is coupled to the I/O command initiator (as opposed to another network switch), the current network switch is configured to route I/O commands received from the I/O command initiator to the storage endpoint or next network switch in the path if the I/O commands identify the virtual storage device as the destination. Similarly, if the current network switch is coupled to the storage endpoint, the current network switch is updated to route the I/O commands to the storage endpoint. If the current network switch is coupled to other network switches, the current network switch is configured to route the I/O commands to another network switch that is "closer" to the storage endpoint.

The operations performed by the network manager to configure the current network switch can also vary depending on the current network switch. For example, some network switches might implement an API that allows the network manager to specify a command (e.g., "update routing table") and associated parameters (e.g., "source", "destination", "route to"). In some instances, the network manager might interact with the network switch via a shell or other mechanism. After the network manager configures the current network switch to route I/O commands from the I/O command initiator to the storage endpoint, control flows to block 610.

At block 610, the network manager determines whether all network switches have been configured. If all of the network switches have been configured, the process ends. If all of the network switches have not been configured, control flows back to block 606.

The operations depicted in FIG. 6 can be adapted for similar commands as well. For example, if the network manager receives a command to stop routing I/O commands between an I/O command initiator and a storage endpoint, the network manager can determine which network switches are currently configured to route the I/O commands accordingly and update the network switches to stop routing the I/O commands.

As mentioned above, the criteria used to identify network traffic by a network switch can include information other than a source and destination. For example, the network traffic might include an application identifier, stream identifier, etc. A network switch can be configured to route network traffic based on the additional criteria, which can allow different applications (or other components) executing on a single virtual machine to use different storage endpoints with a single virtual storage device.

Figure 7:
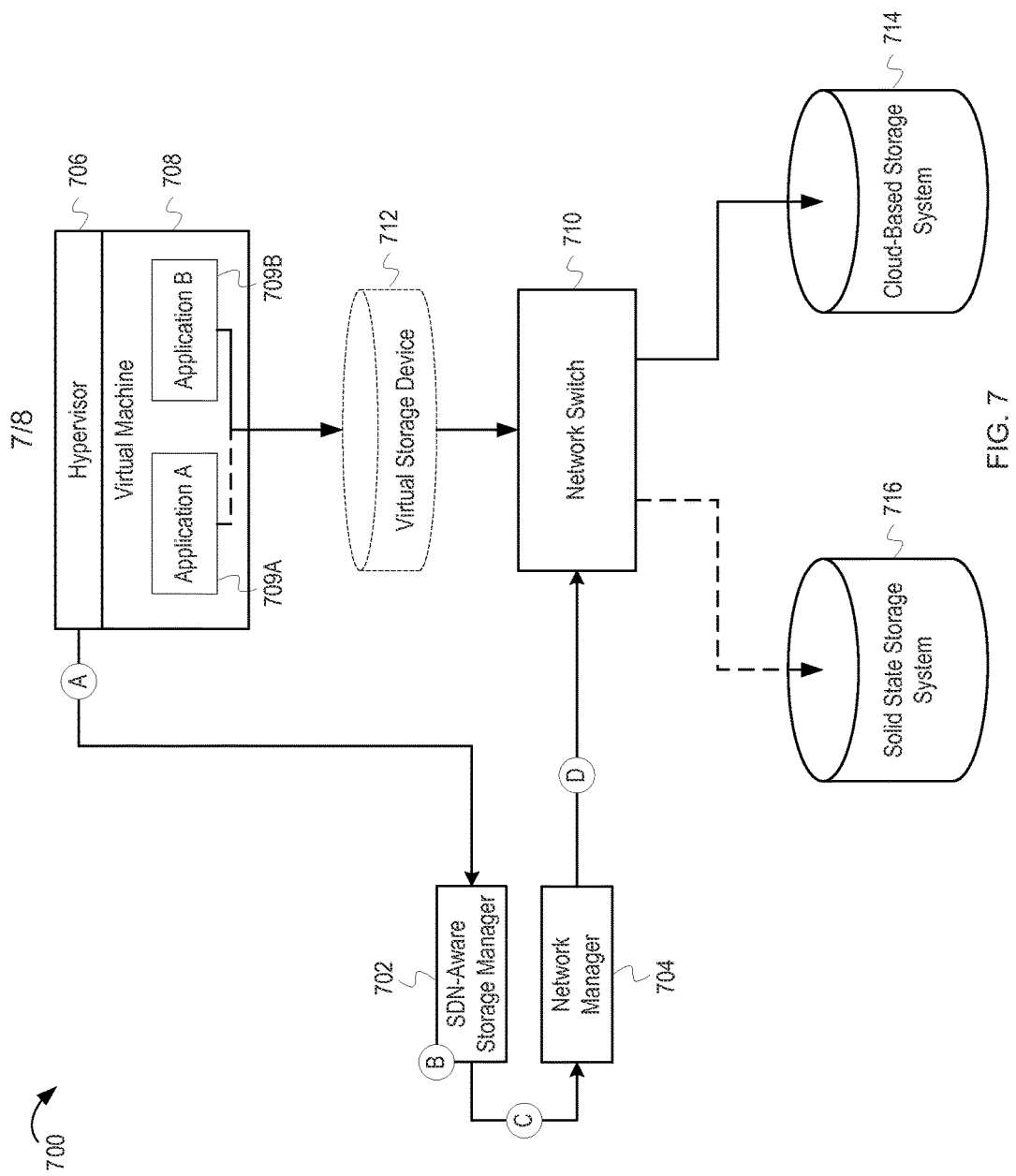
FIG. 7 depicts an example virtual computing environment with an SDN-aware storage manager and multiple applications executing on a virtual machine.

FIG. 7 depicts an example virtual computing environment with a storage manager and multiple applications executing on a virtual machine. FIG. 7 depicts a virtual computing environment 700, including a storage manager 702, a network manager 704, a hypervisor 706, and a network switch 710 (hereinafter "switch 710"). The hypervisor 706 manages a virtual machine 708. The virtual computing environment 700 also includes a virtual storage device 712, a cloud-based storage system 714, and a solid state storage system 716. The virtual machine 708 includes two applications, application A 709A and application B 709B.

The virtual computing environment 700 can be configured substantially similar to the virtual computing environment 100 depicted in FIG. 1. Each of the components of the virtual computing environment 700 is identified by a network identifier and may also be identified by a component identifier. Application A 709A and application B 709B are identified by the network identifier associated with the virtual machine 708 and application identifiers. The switch 710 maintains a routing table similar to the routing table maintained by the switch 110 depicted in FIG. 1. The initial routing table maintained by the switch 710 does not include entries associated with the virtual machine 708.

Example Operations

At stage A, the hypervisor 706 requests that the storage manager 702 provision solid state-based storage for application A 709A and cloud-based storage for application B 709B. The request conforms to the storage-specific API implemented by the storage manager 702. The request identifies the virtual machine 708, application A 709A, application B 709B, and the virtual storage device 712.

At stage B, the storage manager 702 identifies the solid state storage system 716 and the cloud-based storage system 714 as conforming to the request received at stage A. After the storage manager 702 receives the request, the storage manager 702 analyzes available storage systems to determine which of the storage systems meet the criteria specified in the request. In this example, the request specifies that a subset of the storage be solid state-based and a subset of the storage be cloud-based, although various other criteria can be specified. For example, the request can identify specific storage characteristics, identify an SLO, etc. If the storage manager 702 identifies multiple candidate storage systems, the storage manager 702 might select one based on various factors, such as current load, geographic proximity to the virtual machine 708, etc.

At stage C, the storage manager 702 requests that the network manager 704 update the network configuration such that network traffic from application A 709A to the virtual storage device 712 is routed to the solid state storage system 716 ("first storage manager request"). Additionally, the storage manager 702 requests that the network manager 704 update the network configuration such that network traffic from application B 709B to the virtual storage device 712 is routed to the cloud-based storage system 714 ("second storage manager request"). The requests conform to the network-specific API implemented by the network manager 704. In this example, the first storage manager request identifies the virtual machine 708, application A 709A, the virtual storage device 712, and the solid state storage system 716 as the "source", "destination", "criteria", and "route to" parameters respectively. The second storage manager request identifies the virtual machine 708, application B 709B, the virtual storage device 712, and the cloud-based storage system 714 as the "source", "destination", "criteria", and "route to" parameters respectively. The storage manager 702 can additionally request that network traffic be routed from the solid state storage system 716 and the cloud-based storage system 714 to the virtual machine 708, as described above (related operations, as described above, are not described in this example).

At stage D, the network manager 704 requests that the switch 710 route network traffic to the solid state storage system 716 if the network traffic is received from the virtual machine 708, identifies application A 709A as the source application, and identifies the virtual storage device 712 as the destination. Additionally, the network manager 704 requests that the switch 710 route network traffic to the cloud-based storage system 714 if the network traffic is received from the virtual machine 208, identifies application B 709B as the source application, and identifies the virtual storage device 712 as the destination. The requests conform to the network switch-specific API implemented by the switch 710. As described above at stage D of FIG. 1, the network manager 704 may perform additional operations prior to sending the requests to the switch 710.

At stage E, the switch 710 updates the routing table in accordance with the requests from the network manager 704. In particular, the switch 710 adds an entry to the routing table so that network traffic is routed to the solid state storage system 716 if the network traffic is received from the virtual machine 708, identifies application A 709A as the source application, and identifies the virtual storage device 712 as the destination, as depicted by the second entry in Table 6. The switch 710 also adds an entry to the routing table so that network traffic is routed to the cloud-based storage 714 if the network traffic is received from the virtual machine 708, identifies application B 709B as the source application, and identifies the virtual storage device 712 as the destination. In the first entry of Table 6, the criteria field specifies that the application identifier ("app-id") match the application identifier for application A 709A. In the second entry of Table 6, the criteria field specifies that the application identifier match the application identifier for application B 709B.

TABLE 6

| SOURCE | DESTINATION | CRITERIA | ROUTE TO |
| --- | --- | --- | --- |
| Virtual Machine Network Identifier | Virtual Storage Device Network Identifier | app-id = Application A Identifier | Solid State Storage System Network |

TABLE 6-continued

| SOURCE | DESTINATION | CRITERIA | ROUTE TO |
| --- | --- | --- | --- |
| Virtual Machine Network Identifier | Virtual Storage Device Network Identifier | app-id = Application B Identifier | Identifier Cloud-based Storage System Network Identifier |

After the routing table is updated at stage E, the routing of network traffic (and thus, I/O commands) is dependent upon the particular application from which the network traffic originates. Thus, the virtual machine 708 can be configured to access a single logical storage device (the virtual storage device 712), but each application accesses a different storage endpoint. To otherwise provide for different storage endpoints on a per-application basis, the hypervisor 706 would typically be configured to access two different virtual storage devices. The hypervisor 706 would, in turn, provide access to the different virtual storage devices to the virtual machine 708 and the virtual machine 708 would present the virtual storage devices as individual storage devices. Each application would thus be configured to access one of the virtual storage devices accordingly. Thus, the configuration of the hypervisor 706, virtual machine 708, and applications are simplified.

Further, consider a scenario in which conditions of the virtual computing environment 700 change. For example, the workload of application A 709A may change to a workload that is less performance-oriented or the solid state storage system 716 may fail. In such a scenario, the storage manager 702 might provision a different storage endpoint (not depicted). Without the functionality disclosed herein, a new virtual storage device would be created. The hypervisor 706 would be reconfigured to access the new virtual storage device and allow the virtual machine 708 to access the new virtual storage device. Further, virtual machine 708 would present the new virtual storage device as a new storage device available to application A 709A and application A 709A would be reconfigured to access the new storage device. However, with the functionality disclosed herein, the new storage endpoint is provisioned and the network traffic directed to the virtual storage device 712 is routed to the new storage endpoint without modifying the configuration of the hypervisor 706, the virtual machine 708, or application A 709A.

The operations described in relation to FIG. 7 can be adapted for virtual computing environments that include more than two applications, applications running on multiple virtual machines, multiple hypervisors, etc. Further, routing network traffic/I/O commands based on application identifiers is an example of a particular criterion. The operations described above can be adapted to use various other criteria, such as stream identifier, port number, protocol type, etc. For example, I/O commands originating from a single application can be routed to different storage endpoints based on the particular storage protocol being used.

The operations depicted in FIGS. 3 through 6 can be adapted to include functionality that allows I/O commands to be routed based on criteria other than source and destination, such as application identifier, stream identifier, etc.

Additional Variations/Details

As described above, using network functionality to route I/O commands to different storage endpoints allows for the storage endpoints to be changed with little or no disruption to a virtual machine or related component. For example, a storage manager can implement tiered storage using any available storage system. Tiered storage classifies different storage into "tiers" based on aspects such as performance. For example, storage with the highest performance (e.g., a storage system utilizing solid state drives) might be the highest tier, while storage with the lowest performance might be the lowest tier (e.g., cloud-based storage). Although a single storage system might be capable of implementing tiered storage, the functionality would be limited to that of the single storage system. Consider a scenario in which a virtual storage device uses a single storage system that implements tiered storage as a storage endpoint. If the single storage system did not support particular functionality (e.g., cloud-based storage), a storage manager would provision cloud-based storage as a new storage endpoint. Without the functionality described herein, the storage manager would provision a new virtual storage device that uses the cloud-based storage as a new storage endpoint. To utilize cloud-based storage then, a virtual machine would be reconfigured to use the new virtual storage device. However, by using the disclosures herein, I/O commands sent to the original virtual storage device would be rerouted to the new storage endpoint without reconfiguring the virtual machine to use a new virtual storage device (i.e., transparently to the virtual machine).

As illustrated by the tiered storage example, utilization of a storage manager and network functionality allows for the use of heterogeneous storage systems as storage endpoints. For example, when using a particular storage system as a storage endpoint, the functionality available is limited to the functionality of the storage system, which can include hardware restrictions (e.g., the storage system may only support a particular type of storage or communication interface) or software restrictions (e.g., the storage system may only support block-based storage). The storage manager, however, can be implemented to interface with heterogeneous storage systems with different functionality. The storage manager can thus route I/O commands to the most appropriate storage systems transparently to a virtual machine accessing a virtual storage device.

The network that communicatively couples the components of a virtual computing environment can implement various protocols, and thus the specific operations performed by the components can vary accordingly. For example, the network might implement the Transmission Control Protocol (TCP) and IP over Ethernet. Thus, a network switch communicatively coupled to a virtual machine might establish TCP/IP sessions with the virtual machine and/or individual applications executing on the virtual machine. Similarly, the network switch can establish TCP/IP sessions with the storage endpoints. The sessions can be used to create virtual local area networks (VLANs) between the individual virtual machines/applications and the associated storage endpoints.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 500, 502, 504, and 508 of FIG. 5 can, in some instances, be performed in parallel or concurrently. With respect to FIG. 4, the operations at block 406 might not be performed in some instances. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
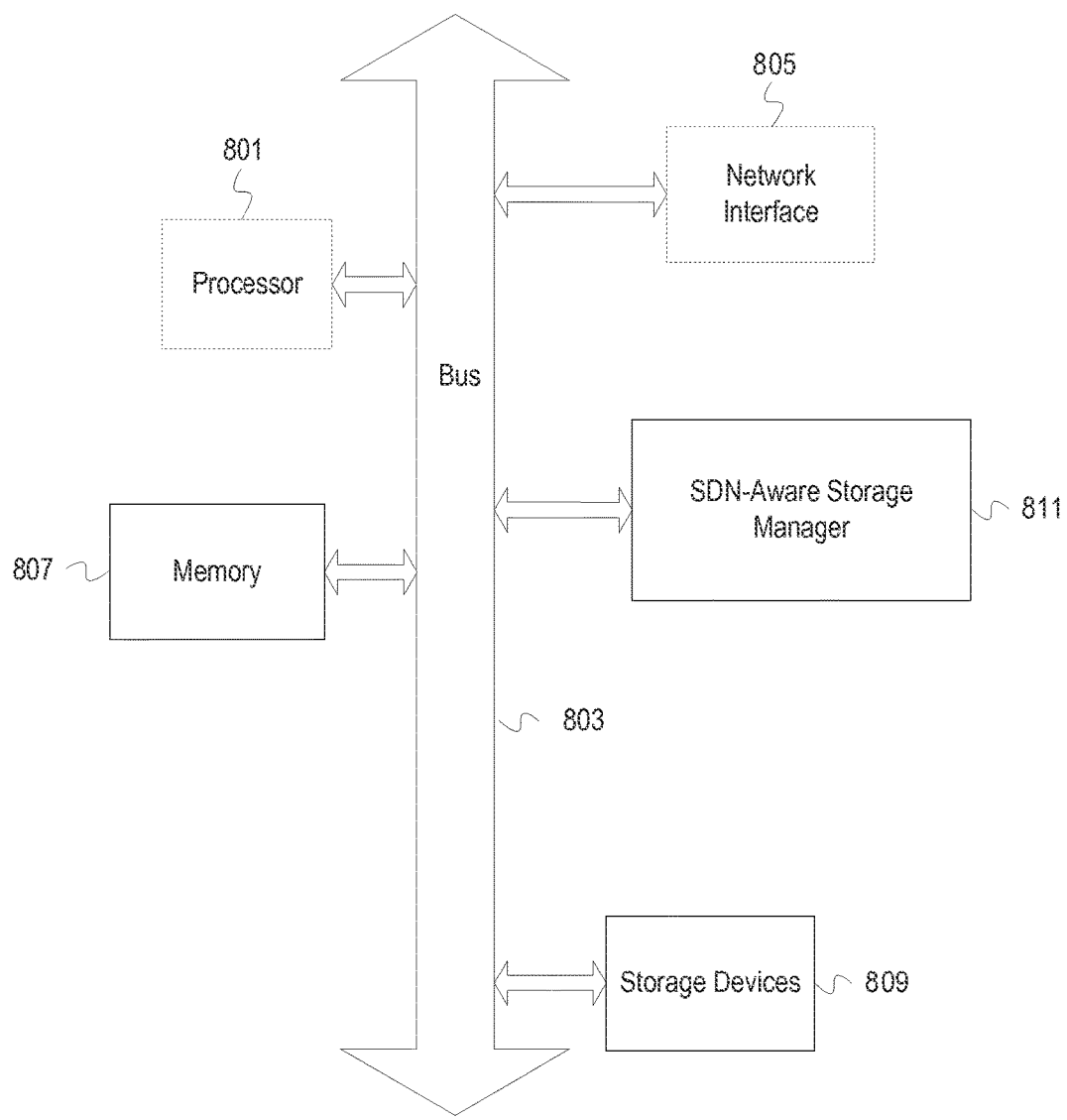
FIG. 8 depicts an example computer system with an SDN-aware storage manager.

FIG. 8 depicts an example computer system with an SDN-aware storage manager. The computer system includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The system also includes an SDN-aware storage manager 811. The SDN-aware storage manager 811 implements functionality to determine that storage characteristics of a virtual storage device should be changed. The SDN-aware storage manager 811 also implements functionality to provision a new storage endpoint the meets the changed storage characteristics and utilize a network switch to route I/O commands to the new storage endpoint. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for network-based elastic storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

As used herein, the term "routing table" includes any table or other data structure that facilitates the routing of network traffic, including forwarding tables. Additionally, although the examples of routing tables depicted above identify destination components as the "route to" components, routing tables can also identify intermediate components (e.g., network switches) as the "route to" components.

As used herein, the term "service level objective" includes service level agreements, quality of service guarantees, and other functionally similar concepts.

Network switches are examples of particular network components that can be used to route I/O commands. Thus, where the examples described above refer to network switches, the operations can be adapted to other network components that can route I/O commands, such as routers, gateways, etc. The network switches and other similar components can be physical components or can be virtual components, such as virtual switches (e.g., a "soft switch") and other virtual network functionalities.

When referring to a "cloud," this description is referring to the resources of a cloud service provider, including privately administered clouds. For instance, a cloud can encompass the servers, virtual machines, and storage devices (hereinafter "entities") of a cloud service provider. The entity may be a physical device (e.g., a server) or may be a virtual entity (e.g., virtual server or virtual storage device). Often, access to the resources of a cloud service provider is in accordance with an API or software development kit provided by the cloud service provider. Cloud-based storage includes resources of a cloud service provider that function as one or more storage devices. While the resources underlying cloud-based storage can be similar to resources used for other cloud-based functionality (e.g., cloud-based computing), the resources underlying cloud-based storage may be optimized for storing data.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
receiving a request to change a service level objective (SLO) associated with a virtual storage device, wherein a first input/output (I/O) communication identifying the virtual storage device as a destination using a first network identifier is routed, via a route of a network, to a first storage endpoint identified with a second network identifier;
performing an operation in accordance with the request; and
sending, to an element of the network, a command to update a routing table entry having the first network identifier as the destination and the second network identifier as the route, such that a second I/O communication identifying the virtual storage device as the destination is routed to a second storage endpoint instead of the first storage endpoint in accordance with SLO.

2. The method of claim 1, wherein the I/O communications are sent from a virtual machine of a virtual computing environment that includes the virtual storage device.

3. The method of claim 1, further comprising updating the routing table entry to route the second I/O communication that identifies the virtual storage device as the destination to a third storage endpoint, wherein performing the operation in accordance with the request includes determining that the second and third storage endpoints satisfy the request.

4. The method of claim 1, wherein the element of the network includes at least one of a network switch, a software network switch, and a network manager.

5. The method of claim 1, wherein said performing the operation in accordance with the request comprises:
identifying a storage device that matches the SLO;
configuring the storage device as the second storage endpoint; and
migrating data from the first storage endpoint to the second storage endpoint.

6. The method of claim 1, wherein performing the operation in accordance with the request further comprises configuring a storage device to match the SLO.

7. The method of claim 1, wherein performing operation in accordance with the request further comprises determining that at least a first of a plurality of storage devices satisfies the change to the SLO.

8. One or more non-transitory machine readable storage media having program code configured to:
receive a request to change a service level objective (SLO) associated with a virtual storage device, wherein a first input/output (I/O) communication that identifies the virtual storage device using a first network identifier is routed, via a route of a network, to a first storage endpoint identified with a second network identifier;
perform an operation in accordance with the request; and
send, to an element of the network, a command to update a routing table entry having the first network identifier as the destination and the second network identifier as the route, such that a second I/O communication identifying the virtual storage device as the destination is route to a second storage endpoint instead of the first storage endpoint in accordance with the SLO.

9. The machine readable storage media of claim 8, wherein the I/O communications are sent from a virtual machine of a virtual computing environment that includes the virtual storage device.

10. The machine readable storage media of claim 8, further comprising program code configured to update the routing table entry to route the second I/O communication that identifies the virtual storage device as the destination to a third storage endpoint, wherein the program code configured to perform the operation in accordance with the request includes program code configured to determine that the second and third storage endpoints satisfy the request.

11. The machine readable storage media of claim 8, wherein the element of the network comprises at least one of a network switch, a software network switch, and a network manager.

12. The machine readable storage media of claim 8, wherein the program code configured to perform the operation in accordance with the request further comprises program code configured to:
identify a storage device that matches the SLO;
configure the storage device as the second storage endpoint; and
migrate data from the first storage endpoint to the second storage endpoint.

13. The machine readable storage media of claim 8, wherein the program code configured to perform the operation in accordance with the request further comprises program code configured to configure the storage device to match the SLO.

14. An apparatus comprising:
a processor;

a machine-readable medium having stored therein program code executable by the processor to cause the apparatus to,
- detect a request to change a first storage characteristic of a virtual storage device;
- based on a determination that a first storage device cannot satisfy the request, select from a plurality of storage devices a second storage device that can satisfy the request; and
- update routing information in a network that identifies the virtual storage device as a destination and identifies the first storage device as a first route with the second storage device identified as a second route, such that a first communication from a source is routed to the second storage device instead of the first storage device; and
- further update routing information in the network to route a second communication from the second storage device to the source in accordance with the first storage characteristic.

15. The apparatus of claim 14, wherein the program code to update the routing information further comprises program code executable by the processor to cause the apparatus to send a command to a manager of the network to update the routing information.

16. The apparatus of claim 14, wherein the program code to update the routing information further comprises program code executable by the processor to cause the apparatus to send a command to a network element to update the routing information.

17. The apparatus of claim 14, wherein the machine-readable medium having program code stored therein further comprises program code executable by the processor to cause the apparatus to configure the second storage device to satisfy the request after selection of the second storage device.

18. The apparatus of claim 14, wherein the first storage characteristic is a static characteristic and a second storage characteristic is a configurable storage characteristic, wherein the program code to cause the apparatus to configure the second storage device further comprises the program code executable by the processor to cause the apparatus to configure the second storage device according to the configurable storage characteristic.

19. The apparatus of claim 14, wherein the selection of the second storage device is based on a factor selected from one or more of a current load of the second storage device and a geographic proximity to the source.

20. The apparatus of 14, wherein the first storage characteristic is one of a service level objective, a type of underlying storage, and a performance threshold.

* * * * *

UNITED STATES PATENT AND TRADEMARK OFFICE
CERTIFICATE OF CORRECTION

PATENT NO. : 10,244,050 B2
APPLICATION NO. : 14/805147
DATED : March 26, 2019
INVENTOR(S) : Ameya Prakash Usgaonkar It is certified that error appears in the above-identified patent and that said Letters Patent is hereby corrected as shown below:

In the Claims

Claim 8, Column 26, Line 34 should read:
routed to a second storage endpoint instead of the first Signed and Sealed this
Thirteenth Day of October, 2020

Andrei Iancu
*Director of the United States Patent and Trademark Office*